Aug. 25, 1931.     C. J. CLARKE     1,820,781
FISHING REEL
Original Filed Nov. 19, 1929
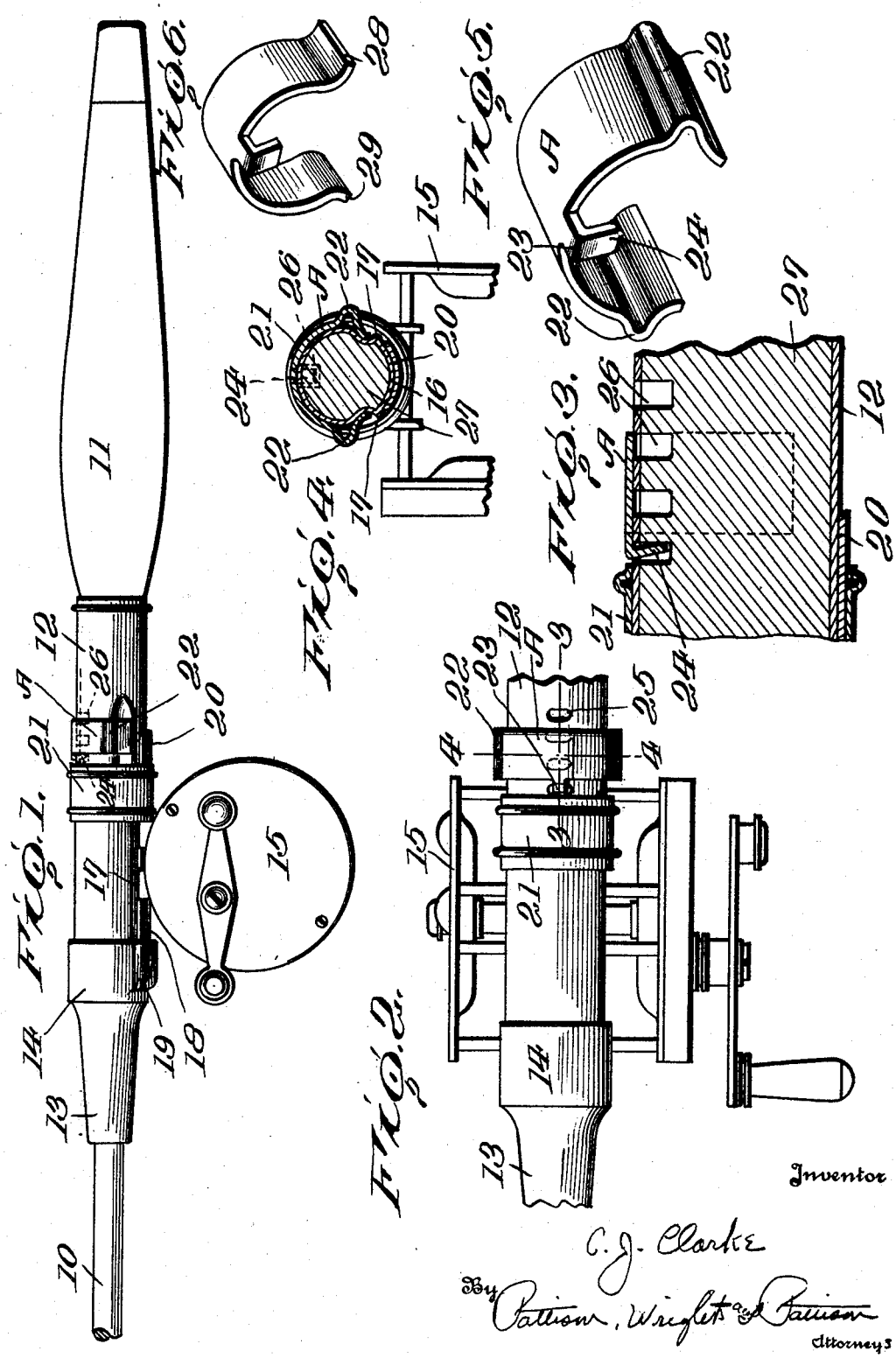

Patented Aug. 25, 1931

1,820,781

UNITED STATES PATENT OFFICE

CHARLES J. CLARKE, OF KINGSBURG, CALIFORNIA

FISHING REEL

Original application filed November 19, 1929, Serial No. 408,341. Divided and this application filed December 18, 1930. Serial No. 503,317.

This invention relates to improvements in fishing reels with the specific improvement however being more particularly directed to a locking device for holding the reel against displacement from the rod once it has been properly positioned thereupon, and the present application is a division of applicant's copending application Serial Number 408,341.

As is well known fishing rods as ordinarily constructed have their reels removable and in the majority of instances the reel is secured upon the rod by means of a loose or sliding clamp or band which engages and holds one end of the fishing reel base in place upon the tubular rod. The locking device constituting the present invention is for the purpose of locking or guarding this sliding clamping band against displacement after it has been placed in a locking or clamping position upon the reel base.

One of the primary objects of the invention is therefore the provision of an improved device for locking the clamping means of a fishing reel fastener against displacement.

A further object of the invention is the provision of an improved device of the nature and for the purpose described which is simple and cheap of manufacture yet highly efficient in operation.

Another and further object of the invention is the provision of an improved device for the purpose described which by reason of its construction and operation is readily adaptable to fishing rods and reels now in use with only minor alterations to the rod, thus making a very marketable device.

Further specific objects, novel features of construction and improved results of the invention will appear more specifically from the following description when read in the light of the disclosure of the accompanying drawings.

In the drawings:

Figure 1 is a view in side elevation of a fishing rod and reel having applied thereto the improved invention.

Fig. 2 is a plan view illustrating the manner of application of the improved locking device to the rod and reel.

Fig. 3 is a fragmentary enlarged vertical longitudinal sectional view taken on the line 3—3 of Figure 2.

Fig. 4 is a transverse vertical sectional view taken on the line 4—4 of Figure 2.

Fig. 5 is a perspective view of the improved locking device.

Fig. 6 is a perspective view of a modified form of locking device.

Referring now to the drawings in which like parts are designated by similar reference numerals throughout the description, and referring particularly to the illustration of the rod and reel, which illustration is that of a conventional or well known type of rod and reel found in general use, it will be seen that the rod 10 is provided with the ordinary butt or handle 11. Interposed between the rod portion 10 and the handle 11 and connecting them is a tubular portion 12 which forms the reel seat and this tubular portion 12 is connected to the rod portion 10 by a fixed ferrule 13 which has a ring-like portion 14.

It should be understood that the reel can be of any desired form and the reel illustrated in the drawings is intended to be merely a conventional showing and is designated as an entirety by the numeral 15. This reel is provided with an elongated base 16 which in transverse section is arc shaped so as to readily rest upon and engage the tubular portion 12 of the rod. When in place upon its seat the edges of the reel base 16 are paralleled by the longitudinally extending ribs or fins 17 which assist in preventing the reel base from rotating or sliding around the tubular rod portion.

The reel is fastened upon the tubular portion 12 of the rod in a conventional manner in that the reel base end 18 is slid beneath the raised portion 19 provided in the ring portion 14 of the ferrule 13. This leaves the opposite end 20 of the reel base loose but this end is secured to the tubular portion 12 by the clamping ring or band 21 which slides up over this end of the reel base and securely clamps it in place upon its seat as clearly illustrated in Figure 1 of the drawings.

The construction thus far described is conventional of any fishing rod and reel to be found on sale and is a construction which is commonly and extensively in use.

The present invention constitutes an improvement to be used in conjunction with the construction thus far described and by reference to Figure 5 of the drawings a perspective view of the locking device constituting the present invention will be seen.

This locking device which is designated as an entirety by the reference letter A is made in one integral piece and to function in the intended manner it should be composed of some spring or resilient material. The locking device need not necessarily be of the exact form or shape illustrated in this figure of the drawings as departures in shape and form could be made without departing from the spirit of the invention. This locking device is made in the form of a band bent into approximately a semi-circular shape having adjacent its ends outwardly flared or bulged portions 22 which extend throughout the width of the band in its preferable form. The band at one edge and central of its length is provided with an outwardly and downwardly extending L-shaped lug made up of the two legs 23 and 24. The leg 24 in addition to extending downwardly is also canted or bent backwardly towards the band.

The internal diameter of this lock A is slightly less than the external diameter of the reel supporting tubular portion 12 of the rod and consequently when the locking member is pushed upon this portion 12 of the rod it is expanded and therefore frictionally engages the same.

To adapt the fishing rod and reel for the application of this improved lock is a simple matter in that it is only necessary to drill in the tubular portion 12 of the rod a series of holes 25 at a point thereon opposite to that assumed by the end 20 of the reel base and slightly forward of that end in a direction towards the handle 11 of the rod. It is also necessary to drill or otherwise provide beneath these holes 25 openings 26 in the butt portion 27 of the rod handle 11, which butt portion extends into the tubular rod portion 12 as is clearly indicated in Figure 3 of the drawings.

The manner of application of the lock A is clearly indicated in the drawings where it will be seen that when the lock is positioned upon the tubular portion 12 of the rod the leg 24 of the L-shaped lug portion of the lock is caused to enter one of the holes 25 in the rod and extend into the opening 26 therebelow. Figure 3 of the drawings clearly illustrates the fact that the positioning of the lock in this manner will absolutely prevent any displacement of the clamping ring 21 with the result that the reel when once clamped in position by this ring 21 and backed up by the lock A will remain so clamped insolong as the lock is in position.

The outwardly flared portions 22 of the lock provide a means whereby the fingers of the operator can readily grasp and quickly remove the lock from the rod.

Figure 6 illustrates a slightly modified form of lock in that the ends of the band forming the lock are flared outwardly as indicated at 28 and 29 to form a different type of finger grasp to be used in removing the lock from the reel supporting portion 12 of the rod. The modified form of the invention operates in the same manner as the preferred form and is applied to the rod in exactly the same manner.

Having thus described my invention what I claim and desire to secure by Letters Patent is:

1. In combination with a reel fastening for fishing rods comprising in part a sliding clamping member, a lock composed of a major segment of a circle of spring material provided with a downwardly extending lug, said rod behind said clamping member being provided with an opening, said lock being applied to said rod and held against vertical displacement thereon through resilient engagement therewith and lateral displacement thereon through engagement of the lock lug with the opening in the rod.

2. In combination with a reel fastening for fishing rods comprising a movable clamping member, a lock composed of resilient material formed into a semi-circular shape and provided with a downwardly extending lug, said lock further provided with outwardly flared portions to form finger holds, said rod behind said clamping member being provided with an opening, and said lock being held against vertical displacement from said rod through resilient engagement therewith and lateral displacement through reason of the lock lug having engagement with the opening in the rod, for the purpose described.

3. In combination with a reel fastening for fishing rods comprising a movable clamping member, a lock composed of a length of resilient material formed into a major segment of a circle and provided with a downwardly extending lug, said lock adjacent its ends being provided with outwardly flared portions to form finger holds, said rod behind said clamping member being provided with an opening, and said lock being held against vertical displacement from said rod through resilient engagement therewith and lateral displacement from said rod through engagement of the lock lug with the opening provided in the rod, said parts operating for the purpose described.

4. In combination with a reel fastening for fishing rods comprising a sliding clamping member, a lock composed of a major segment of a circle of spring material and provided with a downwardly and rearwardly extending lug, finger holds on said lock segment immediately above its ends, said rod behind said clamping member being provided with an opening, and said lock being held against vertical displacement from said rod through resilient engagement therewith and lateral displacement from said rod through the engagement of the lock lug with the opening in the rod, said parts operating for the purpose described.

5. In combination with a reel fastening for fishing rods comprising a movable clamp member on said rod for clamping said reel and an opening in said rod at a point behind the clamping position of said clamping member, of a lock to prevent movement of said clamping member, said lock comprising a piece of resilient material provided with a downwardly extending lug, said piece of material to be applied to said rod back of said clamping member and be retained thereon against vertical displacement through resilient engagement with the rod and held against longitudinal displacement through engagement of its lug with the opening in the rod.

6. In combination with a reel fastening for fishing rods comprising a sliding clamping member, a lock composed of a ribbon of spring material formed into a semi-circular shape and provided with a downwardly extending lug, the ends of said ribbon being flared outwardly to form finger holds, said rod behind said clamping member being provided with openings, and said lock being held against vertical displacement from said rod through resilient engagement therewith and lateral displacement through the reason of the lock lug having engagement with one of the openings, for the purpose described.

In testimony whereof I hereunto affix my signature.

CHARLES J. CLARKE.